United States Patent [19]
Gerken

[11] 3,905,173
[45] Sept. 16, 1975

[54] RESISTANCE-WELDABLE STUD

[75] Inventor: John M. Gerken, Chagrin Falls, Ohio

[73] Assignee: TRW Inc., Cleveland, Ohio

[22] Filed: Nov. 21, 1974

[21] Appl. No.: 525,770

Related U.S. Application Data
[63] Continuation of Ser. No. 363,889, May 25, 1974, abandoned.

[52] U.S. Cl............. 52/758 B; 219/99; 219/150 V; 151/41.7
[51] Int. Cl.²......................................... B23K 11/14
[58] Field of Search............. 151/41.7; 85/9 R, 9 W; 219/99, 150 V; 29/190; 52/758 B, 758 R

[56] References Cited
UNITED STATES PATENTS

| | | | |
|---|---|---|---|
| 2,202,405 | 5/1940 | Smith.............................. | 151/41.7 |
| 2,583,868 | 1/1952 | Mociun............................ | 151/41.7 |
| 2,771,262 | 11/1956 | Laystrom.......................... | 85/9 R |
| 3,008,552 | 11/1961 | Cushman et al................... | 151/41.7 |
| 3,157,428 | 11/1964 | Kishline.......................... | 151/41.7 |

FOREIGN PATENTS OR APPLICATIONS

| | | | |
|---|---|---|---|
| 683,228 | 11/1952 | United Kingdom................ | 151/41.7 |
| 997,773 | 7/1965 | United Kingdom................ | 85/9 R |

OTHER PUBLICATIONS
Publication of Ohio Nut and Bolt Company, p. 3.

*Primary Examiner*—Marion Parsons, Jr.
*Attorney, Agent, or Firm*—Allen D. Gutchess, Jr.

[57] ABSTRACT

A resistance-weldable stud is provided. The stud is primarily designed to be welded to a plate having a hole receiving the stud, with a head on one side of the plate and a shank extending from the opposite side. The stud has an enlargement at an end of the shank and a beveled portion beyond the enlargement which terminates in the head. The weld primarily occurs between the beveled portion of the stud and the edge of the hole on the side of the plate where the head is located. When the weld is completed, the enlargement preferably does not extend beyond the other side of the plate opposite the head.

2 Claims, 5 Drawing Figures

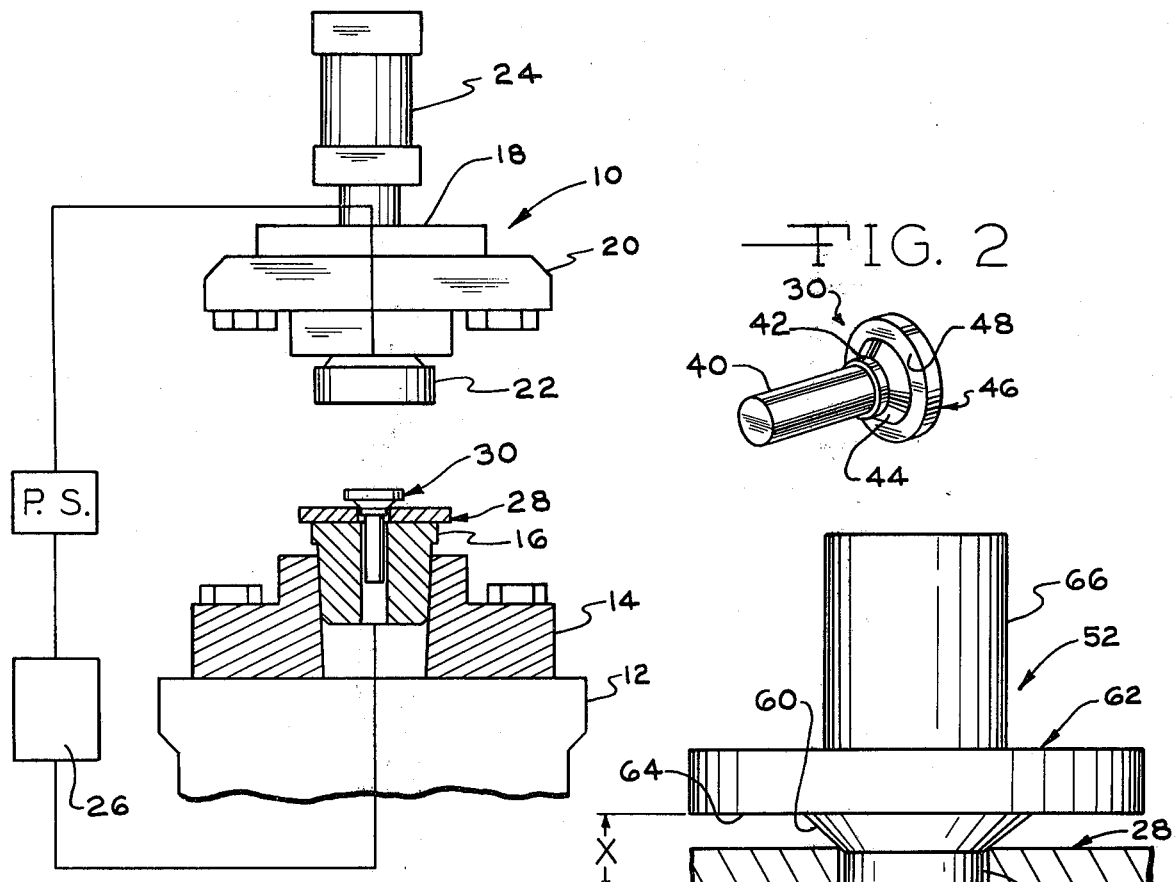
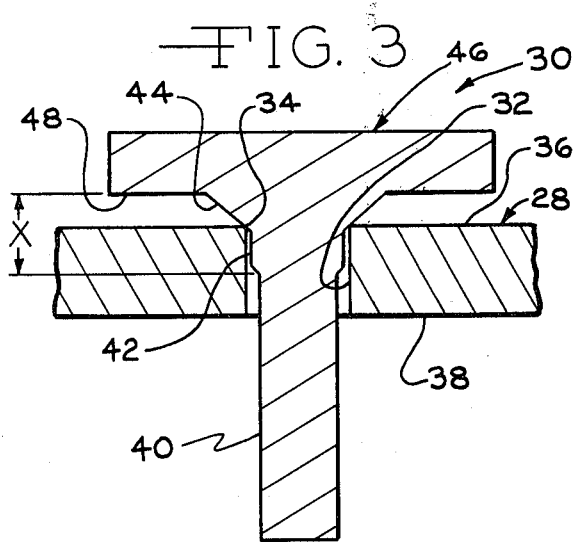
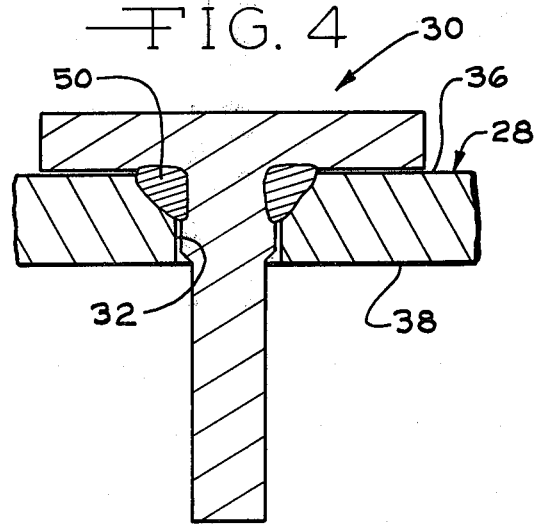

RESISTANCE-WELDABLE STUD

This is a continuation of application Ser. No. 363,889, filed May 25, 1974, now abandoned.

This invention relates to a resistance-weldable stud and particularly to such a stud having a shank and a beveled portion with an enlargement therebetween.

A resistance-weldable stud according to the invention is intended to be welded to a plate having a hole extending therethrough, with the stud having a shank extending beyond the plate on the side opposite the weld. The resistance-weldable stud has a cylindrical enlargement exceeding the size of the shank but preferably being smaller than the hole, the enlargement being located at one end of the shank. A beveled portion extends outwardly from the enlargement at the end thereof opposite the shank and a head extends from the beveled portion and is spaced from the enlargement.

The weld between the stud and the plate is made specifically between the beveled portion and the edge of the hole on the side of the plate where the head is located. Here the plate and the beveled portion are in contact along a circular line. When pressure is applied between the plate and the stud and current is passed therethrough, the beveled portion of the stud is substantially melted and the head moved toward the surface of the plate around the hole. The distance from the lower surface of the head to the end of the enlargement adjacent the shank preferably is less than the thickness of the plate so that the enlargement does not extend beyond the opposite surface of the plate when the weld is complete.

The beveled stud with the cylindrical enlargement has a number of advantages. The enlargement being larger than the shank and closer to the diameter of the hole, aids in positioning the stud concentrically with respect to the hole to accurately position the shank as well as assure its perpendicularity. The stud design also facilitates automatic feeding of the studs from a source to the welding position in the hole in the plate. The enlargement enables the weld area of the stud to be increased without changing the shank size by increasing the diameter at the base of the bevel. The enlargement adjacent the beveled portion also inhibits movement of the molten weld metal through the hole in the plate, which metal otherwise may be deposited on the shank or on the opposite surface of the plate. The enlargement also substantially eliminates the possibility of arcing between the shank and the opposite side of the plate, which can result in metal deposit or pitting on the plate surface or the shank. Deposits or pitting are particularly undesirable where the shank is to serve as a bearing surface. The enlargement and beveled portions also may reduce distortion of the plate around the hole caused by the weld.

It is, therefore, a principal object of the invention to provide an improved resistance-weldable stud having a shank, enlargement, beveled portion, and head achieving the advantages discussed above.

Many other objects and advantages of the invention will be apparent from the following detailed description of preferred embodiments thereof, reference being made to the accompanying drawings, in which:

FIG. 1 is a schematic view in elevation of resistance welding apparatus, with a plate and a stud according to the invention in welding position;

FIG. 2 is a view in perspective of a resistance-weldable stud embodying the invention;

FIG. 3 is a somewhat enlarged view in cross section of the stud in welding position in the plate;

FIG. 4 is a view similar to FIG. 3 after the weld is completed; and

FIG. 5 is a view similar to FIG. 3 of a modified stud in welding position in a plate.

Referring particularly to FIG. 1, resistance welding apparatus is indicated at 10 and is of a substantially conventional design. The apparatus includes a lower platen 12 on which is mounted a lower electrode holder 14 with a lower electrode 16 frictionally engaged therein. The apparatus further includes an upper press platen 18, an upper electrode holder 20, and an upper electrode 22. The upper platen and the upper electrode are moved by a fluid-operated ram 24. A power source P.S. and a control unit 26 are suitably connected to the lower electrode 16 and the upper electrode 22. A plate 28 to which a resistance-weldable stud 30 is to be welded is located on the lower electrode 16 with the stud extending through an opening therein.

In a typical resistance welding cycle in which the shank of the stud 30 has a one-quarter inch diameter, the upper electrode 22 is moved down against the stud by the ram 24 with a force of 1,300 pounds. Current is then supplied between the electrodes, through the stud and the plate, by the welder transformer. When ignitrons fire in the primary circuit, secondary current is initiated for five to thirty cycles with an R.M.S. value of 15,000 to 25,000 amps.

As shown in FIG. 3, the plate 28 has a hole 32 therein forming a circular edge 34 with an upper surface 36 of the plate. The plate 28 also has a lower surface 38 which is parallel to the surface 36 in this instance.

The stud 30 (FIGS. 2–4) includes a cylindrical shank 40 of uniform cross section or area throughout its length. A cylindrical enlargement 42 which is larger in diameter or cross-sectional area than the shank 40 is located at one end of the shank and is structurally integral therewith. A weldable beveled portion 44 extends upwardly and outwardly from the cylindrical enlargement 42, being structurally integral therewith, and constitutes the portion of the stud which is melted and welded to the plate. Finally, a head 46 is structurally integral with the beveled portion 44 at the end spaced from the cylindrical enlargement 42. The head 46, in this instance, has a lower annular flat surface 48 adjacent the beveled portion 44, as shown in FIG. 4. The pressure and current of the apparatus 10 forms an annular body 50 of weld metal at the line contact between the beveled portion 44 of the stud and the edge 34 formed between the hole 32 and the surface 36 of the plate 28.

As shown in FIG. 3, the distance between the lower surface 48 of the head 46 and the edge of the cylindrical enlargement 42 adjacent the shank 40, represented by the designation X, is less than the thickness of the plate 28, or the distance between the surfaces 36 and 38 thereof. This assures that when the weld is complete, as shown in FIG. 4, the annular edge or terminus of the cylindrical enlargement 42 will not project beyond the surface 38 of the plate 28. This keeps the shank 40 free of any projection which might interfere with it, particularly in the event it is used as a bearing surface, such as on an axle for a rotatable member and specifically a member which might be located in close relationship with the surface 38 of the plate 28.

The enlargement 42 has a number of important advantages for the stud 30. The enlargement helps maintain concentricity of the stud 30 with respect to the hole 32 to assure accurate positioning of the shank 40. The enlargement 42 facilitates automatic feeding of the stud into the hole in the plate. Further, the enlargement 42 enables a larger weld area to be established to achieve a stronger weld.

The enlargement and its close fit with the hole 32 inhibits weld metal from flowing downwardly onto the shank 40 or onto the edge of the hole 32 adjacent the surface 38. Also of importance, the enlargement 42 assures that the shank 40 will remain spaced from the lower edge of the hole 32. With a closer positioning or an eccentric positioning of the stud and hole, arcing can result between the shank and the plate, resulting in weld metal on one or both or pitting, particularly on the shank. Such arcing heretofore has occurred between the shank and the lower edge of the hole 32 meeting the surface 38, with the resulting weld metal or pitted areas projecting beyond the surface 38 of the plate 28 as the weld progresses and the stud moves lower in the hole to the position of FIG. 4. With the new stud, any arcing which occurs between the stud and the hole 32 will occur between the hole and the enlargement 42. Since the enlargement 42 is designed not to project beyond the plate 28, any such arcing will not be detrimental to the final product and the functioning of the stud. Hence, it is important that the distance X not exceed the thickness of the plate 28. It has been found that distortion of the plate 28 appears to be reduced by employment of the cylindrical enlargement 42.

A slightly modified stud 52 is shown in FIG. 5. The stud 52 is welded to the plate 28 which has a hole 54 of larger diameter therein. The stud 52 has a shank 56 of larger diameter than the shank 40 and a cylindrical enlargement 58 of a larger diameter than the enlargement 42. The stud 52 likewise has a beveled portion 60 of larger cross-sectional area than the beveled portion 44. The diameter of a head 62 is not of particular importance. However, the same distance X still must exist between a lower surface 64 of the head and the annular edge or terminus of the cylindrical enlargement 58. Since, the beveled portion 60 of the stud 52 is of larger diameter, necessarily then the length or thickness of the enlargement 58 will be less than that of the enlargement 42. Nevertheless, the enlargement 58 serves the same functions and has the same advantages as those of the enlargement 42. In this instance, the stud 52 also has a shank 66 extending in the opposite direction from the head 62.

Various modifications of the above-described embodiments of the invention will be apparent to those skilled in the art, and it is to be understood that such modifications can be made without departing from the scope of the invention, if they are within the spirit and the tenor of the accompanying claims.

I claim:

1. In combination, a plate of a fixed thickness having a hole with a circular cross section therein, a resistance-weldable stud to be resistance welded in the hole, said stud having a shank of substantially uniform transverse cross section throughout its length and of generally cylindrical configuration, an enlargement at one end of said shank of cylindrical configuration and structurally integral with said shank, the diameter of said enlargement being more than that of said shank and less than the diameter of said hole, a beveled portion at the end of said enlargement opposite said shank, and a head extending outwardly from said beveled portion at the end opposite said enlargement, said head having a circular configuration in a plane perpendicular to said shank, the distance from the surface of said head adjacent said beveled portion to the end of said enlargement adjacent said shank not exceeding the thickness of said plate.

2. The combination according to claim 1 characteriaed by said head having a second shank extending therefrom in a direction opposite to that of the first shank.

* * * * *